United States Patent

Chiles et al.

[11] Patent Number: 5,819,374
[45] Date of Patent: Oct. 13, 1998

[54] CLIP FASTENER FOR RADIANT TUBING AND OTHER THIN OBJECTS

[75] Inventors: Richard M. Chiles; Daniel T. Chiles; Kimmie F. McGinnis, all of Springfield, Mo.

[73] Assignee: Ellenistic, LLC, Springfield, Mo.

[21] Appl. No.: 890,043

[22] Filed: Jul. 9, 1997

[51] Int. Cl.$^6$ ................ B65D 63/00; F16L 3/00
[52] U.S. Cl. ............ 24/16 PB; 24/17 AP; 24/543; 248/74.3
[58] Field of Search ............. 24/16 PB, 17 AP, 24/30.5 P, 543, 545; 248/74.3

[56] References Cited

U.S. PATENT DOCUMENTS

| | | | |
|---|---|---|---|
| 1,855,645 | 4/1932 | McIntosh | 248/74.3 |
| 3,226,882 | 1/1966 | Lichtenthaler | 24/16 PB |
| 3,893,647 | 7/1975 | Kennedy | 248/74.3 |
| 3,913,187 | 10/1975 | Okuda | 248/74.3 |
| 4,840,345 | 6/1989 | Neil et al. | 24/16 PB |
| 5,367,750 | 11/1994 | Ward | 24/543 |

*Primary Examiner*—Victor N. Sakran
*Attorney, Agent, or Firm*—Shook, Hardy & Bacon

[57] ABSTRACT

A retention clip which secures radiant heating tubing to a reinforcing bar or wire used to reinforce a concrete slab. In one embodiment, the clip has a C-shaped body which includes a pair of parallel legs connected by a straight bight. The bight is hinged in the center so it can be bent to bring the free ends of the legs together. A pin on one leg then enters a socket on the other leg and a flange on the pin interlocks with a shoulder of the socket to hold the clip around the tubing and reinforcing element. The clip body has stiffening ribs to enhance its strength and dimensional stability. An alternative embodiment provides a straight clip body having a central hinge joint and two elbow joints about which the body can be flexed to bring interlocking ends together. Each elbow joint includes opposing pairs of lugs which provide stability. A block on one side of each elbow joint enters a groove between the opposing lugs to lock the joint against sideward swaying.

16 Claims, 3 Drawing Sheets

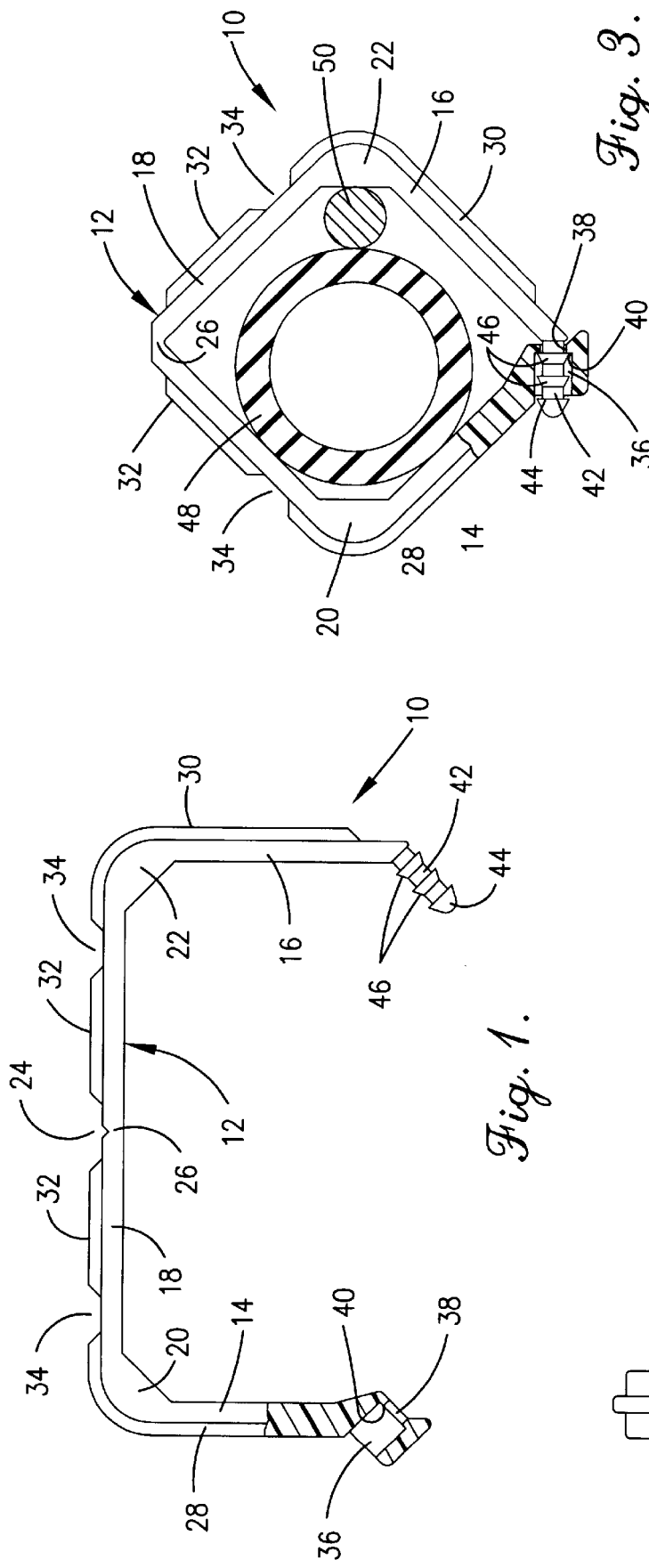

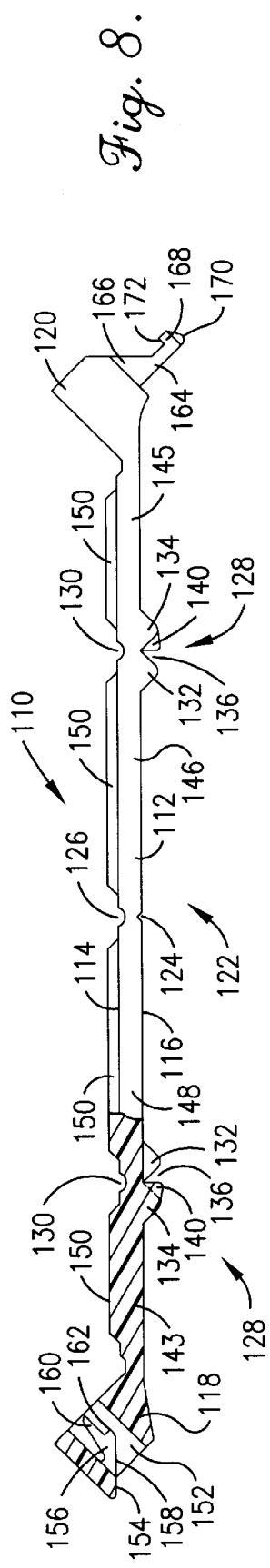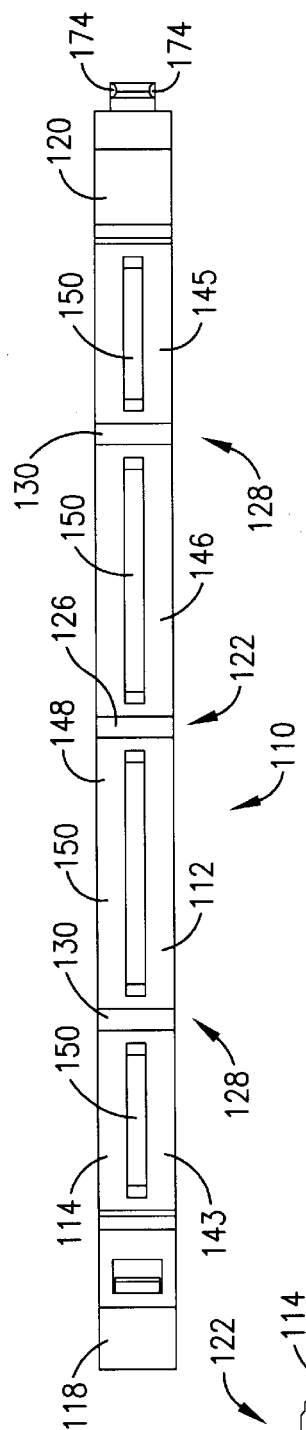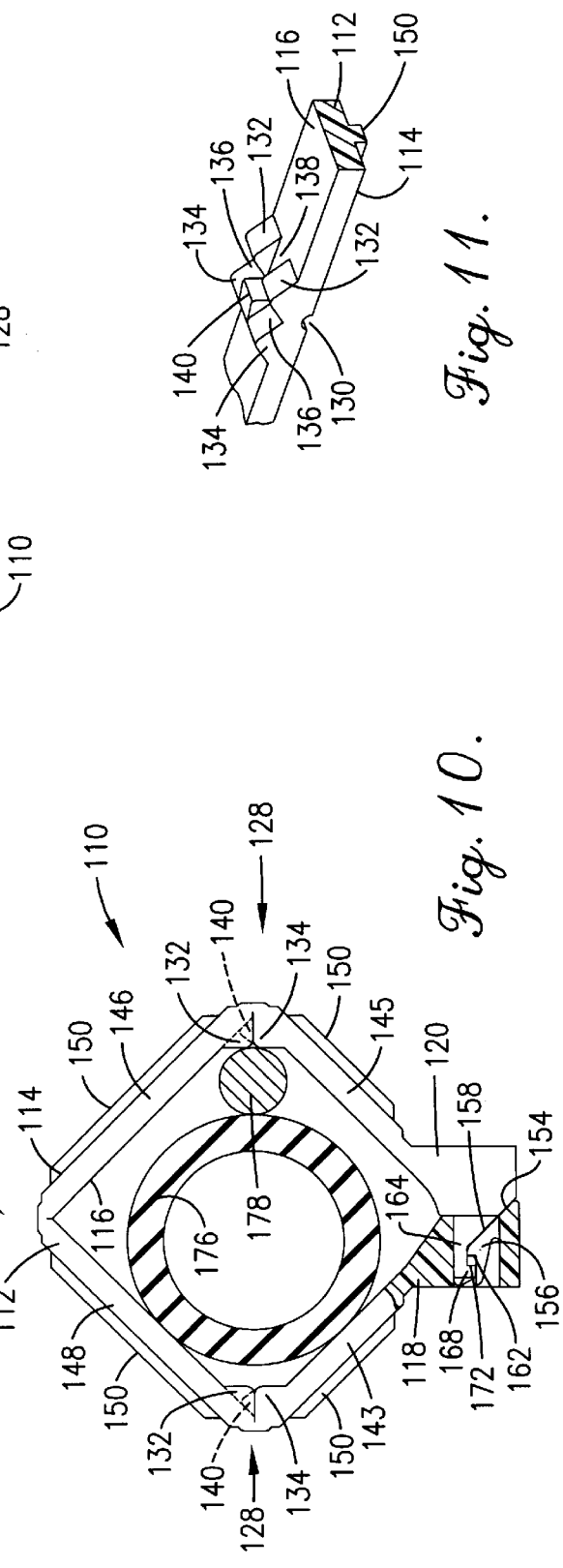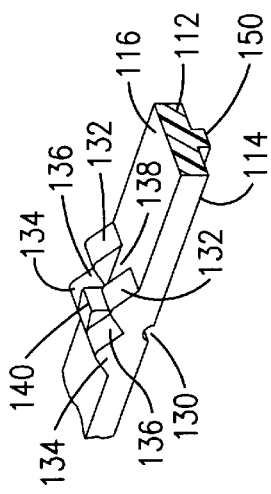

CLIP FASTENER FOR RADIANT TUBING AND OTHER THIN OBJECTS

FIELD OF THE INVENTION

This invention relates generally to tieing together thin objects such as radiant tubing which is used for the heating of floors and other surfaces. More particularly, the invention is directed to a clip fastener which is useful to attach a variety of thin objects together and has particular application in securing radiant tubing to reinforcing bars or mesh embedded in concrete slabs.

BACKGROUND OF THE INVENTION

There are a large variety of situations that involve a need to repetitively bind long thin objects together. Some examples are securing wiring harnesses or hoses in manufacturing operations, securing reinforcing bars, electrical wiring or plumbing components in construction activities, and attaching plants to trellises in greenhouse and nursery applications.

Another example is in hydronic heating which has become increasingly popular in recent years for various types of heating applications. In a typical hydronic heating application, a tube or hose is installed such that when hot fluid is circulated through the tubing, heat is transferred from the tubing to a floor or other surface which is to be heated. It is common for the tubing to be embedded in a concrete slab such as a floor slab or driveway (when the hydronic heating system is used for melting ice and snow) The tubing is arranged in a serpentine pattern or other pattern that is selected to provide the desired application of heat. In order to keep the tubing in place and prevent it from being displaced by the force of the concrete or by installers working in the area, it is necessary to somehow secure the tubing in the desired position. Normally, this is done by connecting the radiant hose or tube to the reinforcing bars or reinforcing mesh that is used for reinforcement of the concrete.

Past practice has involved tying the radiant tubing to the reinforcing bars or wires with either a wire tie or a plastic cable tie. In either case, the worker must use both hands to apply the tie and must either stoop down to apply it or work from his knees. It can easily be appreciated that applying the ties is an awkward and time consuming procedure that adds significantly to the labor and installation costs, especially when it is recognized that a large number of ties are usually required because they are ordinarily applied every 12 or 16 inches of tubing length. It is also common for the ties to be applied improperly, and this can permit the tubing to sag unduly and result in an improper installation. Another problem is that the ties leave ends or "tails" that must either be cut off or pushed down to prevent them from projecting through the top surface of the finished slab.

Other situations that require thin objects to be bound together have typically involved wire ties or cable ties. Many of the same problems are encountered, and it is evident that a need exists for an improved way in which to repetitively secure thin articles in a reliable fashion.

SUMMARY OF THE INVENTION

The present invention is directed to a clip fastener which is specially constructed to secure virtually any type of thin objects together. One application for which tie fastener is especially well suited is in securing a radiant heating tube or hose to a reinforcing member such as a reinforcing bar or wire mesh. In accordance with one embodiment of the invention, the body of the clip initially has the shape of a C. Two legs are connected by a bight portion of the clip body which is initially straight. The free ends of the legs have mating male and female fasteners which interlock when they are brought together. A hinge is formed in the center of the bight portion of the clip body so that the clip can be bent about the axis of the hinge.

This construction allows the clip to be applied either manually or with a tool. In the case of tool application, the clips can be fed in succession into jaws of the tool which apply the clip by passing its mouth (formed between the free ends of the legs of the clip body) over the objects that are to be fastened such as radiant tubing and reinforcing elements. The jaws are then activated to deform the clip about the hinge, thus bringing the mating ends of the clip legs together and interlocking them with the clips surrounding the tubing and reinforcing element to secure them together. When the clip has been installed, it assumes the shape of a square or diamond and captures the objects in a manner to hold them closely against one another. Tool application permits the clips to be installed by a worker in a standing position.

Manual application is also easily accomplished with one hand. The clip is first applied to the objects and is then deformed about the hinge by pressing on the corners where the legs meet the bight portion of the clip body. This brings the mating ends of the clip legs together and securely fastens the objects to one another.

Noteworthy features of the clip are the absence of projecting ends which could project out of the concrete (in a hydronic heating application) and the presence of a wide mouth area which fits easily over the objects which are to be fastened. The clip is also characterized by ribs on the clip body which provide added strength and dimensional stability. The ribs have gaps which allow the clips to be assembled in a string or queue that can be loaded into the application tool so that the clips can be picked off of the assembled string one by one when the tool is used to apply them.

Another embodiment of the invention includes a fastener body which is initially straight and has a central hinge and two elbow joints which define four legs. Each elbow joint has two projecting beads on each side of the joint and a block which fits between the opposing beads when the body is bent about the elbow joint. The opposing beads engage to limit flexure about each elbow joint to 90°, while the fit of the blocks between opposing pairs of beads provides side to side stability at each joint.

DESCRIPTION OF THE DRAWINGS

In the accompanying drawings which form a part of the specification and are to be read in conjunction therewith and in which like reference numerals are used to indicate like parts in the various views:

FIG. 1 is a front elevational view of a retention clip constructed according to a preferred embodiment of the present invention, with the clip in its initial undeformed condition and a portion shown in section for purposes of illustration;

FIG. 2 is an end elevational view of the clip taken from the right side of FIG. 1;

FIG. 3 is a front elevational view similar to FIG. 1 but showing the clip in its deformed condition applied to secure a radiant heating hose to a reinforcing wire, with a portion of the clip shown in section for purposes of illustration;

FIG. 4 is a fragmentary elevational view showing the mating male and female ends of a clip constructed according to a modified embodiment of the invention, with the female end of the clip shown in section and the male and female ends slightly separated as they are being brought together;

FIG. 8 is a front elevational view of a fastener clip constructed according to yet another embodiment of the invention, with the fastener body in an undeformed condition and one end portion shown partially in section for purposes of illustration;

FIG. 9 is a top plan view of the fastener shown in FIG. 8;

FIG. 10 is a front elevational view similar to FIG. 8, but showing the fastener in its deformed condition applied to secure a radiant heating hose to a reinforcing wire, with a portion of the clip body shown in section; and FIG. 11 is a fragmentary perspective view of one of the knuckle joints of the fastener clip shown in FIGS. 8–10, with the fastener in its undeformed condition.

DETAILED DESCRIPTION OF THE INVENTION

Figure 5:
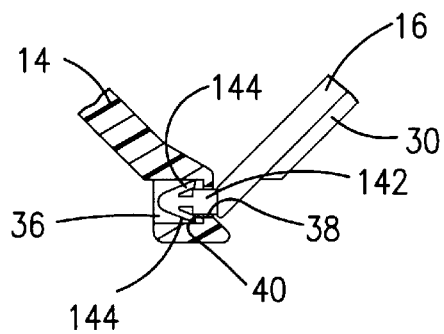
FIG. 5 is a fragmentary elevational view similar to FIG. 4, but showing the male and female ends of the clip interlocked in the installed position of the clip.

Referring now to the drawings in more detail and initially to FIG. 1, numeral 10 generally designates a retention clip constructed according to one embodiment of the present invention. The clip 10 has a body 12 which is shown in its initial undeformed condition in FIG. 1. The body 12 initially has the general shape of a C and includes a pair of parallel legs 14 and 16 which are connected by a bight portion 18. The bight 18 extends between the ends of the legs 14 and 16 and has right angle connections with the legs at corners 20 and 22. The corners 20 and 22 are gusseted or thickened to hold their shape. The body 12 is preferably constructed of a suitable plastic material.

Midway along its length, a notch 24 is formed in the outside surface of the bight 18. The presence of the notch 24 creates a weakened area which provides a hinge 26 about which the bight 18 can be bent such that the free ends of the legs 14 and 16 are brought together, as will be explained more fully. The outside surfaces of the legs 14 and 16 are provided with respective stiffening ribs 28 and 30. The ribs add strength and dimensional stability to the legs and extend around the corners 20 and 22 and partially along the opposite end portions of the bight 18. This prevents the corners 20 and 22 from collapsing or otherwise being susceptible to deformation, as does the fact that the corners 20 and 22 are themselves somewhat thicker than the rest of the clip body 12.

The bight 18 is provided with an additional pair of ribs 32 which are located on opposite sides of the notch 24 so that the bight 18 can be readily bent at the hinge 26. The ribs 32 are spaced from the other ribs 28 and 30 in order to present gaps 34 between the ends of ribs 28 and 30 and the ends of ribs 32. The legs 14 and 16 and the bight 18 are generally flat in shape, and the ribs project outwardly a short distance from the flat outside surfaces of the legs and bight (see FIG. 2).

The free end or tip of leg 14 is provided with a cylindrical socket 36. The axis of the socket 36 is angled relative to the leg 14. A passage 38 which is somewhat smaller in diameter than the socket 36 provides an entry into the socket. At the location where the passage 38 intersects with the socket 36, a flat, annular shoulder 40 is formed and is oriented to face into the socket 36.

The free end or tip of the other leg 16 is provided with a cylindrical pin 42 which forms a male element that mates with the female socket 36. The axis of the pin 42 is angled relative to the leg 16. The diameter of the pin 42 is slightly smaller than that of the passage 38 such that the shank of the pin is able to pass through the passage. A tip portion on the end of the pin 42 has a flange 44 which is larger in diameter than the passage 38 but smaller in diameter than the socket 36. Two additional flanges 46 are formed to project outwardly from the pin 42 at spaced locations along its length. Flanges 44 and 46 are flared such that they can be forced through the passage 38. The orientations of the pin 42 and socket 36 are such that their axes are coincident when the clip body 12 is deformed about the hinge 26 in order to bring the pin and socket into interlocking engagement with one another as shown in FIG. 3.

In use, the retention clip 10 serves to secure a radiant heating tube or hose to a reinforcing element such as a reinforcing bar or mesh wire of the type commonly embedded in concrete slabs for reinforcement purposes. By way of example, FIG. 3 shows the clip 10 installed to secure a radiant heating hose 48 to a reinforcing wire 50. The clip 10 can be applied by hand to the hose 48 and wire 50. The clip can be grasped in one hand by a worker and moved downwardly such that the hose 48 and wire 50 pass through the open mouth area which is formed on the clip body between the socket 36 and pin 42. The worker can then push downwardly on the corners 20 and 22 in order to bend the bight 18 about the hinge 26. As the clip body 12 is deformed in this manner, the socket 36 and pin 42 approach one another. Eventually, the pin 42 passes through the passage 38 and enters the socket 36. The flanges 44 and 46 are frusto-conical in shape such that they can easily be forced through the passage 38 and into the socket 36. When each flange 44 or 46 enters the socket 36, it expands and can abut the shoulder 40 to prevent the pin from pulling out of the socket. The free ends of the legs 14 and 16 are then interlocked with one another, thus securing the clip body 12 in the deformed condition in which it extends around the hose 48 and wire 50, thus capturing the hose and wire within it and securing them together. The clip body has the shape of a square or diamond when deformed, and the wire 50 Is located adjacent to one of the corners.

The provision of multiple flanges 44 and 46 on the pin 42 provides for some adjustment so that different sizes of the hose 48 and wire 50 can be accommodated, with a different one of the flanges 44 and 46 interlocking with the shoulder 40 depending upon the size of the hose 48 and wire 50. The legs 14 and 16 are equal in length and are the same length as each of the two legs formed on the bight 18 when it is bent about the hinge 26.

In normal use, a number of the clips are applied in this fashion in order to secure the entirety of the hose 48 to the remesh wire 50, thus securing the hose 48 in place while concrete is poured to embed it and the reinforcing wire 50 in the finished concrete slab. The clips are installed at regular intervals such as every 16 inches along the length of the hose. It is noted that there are no projecting ends of the clip which could project through the finish concrete surface. It is also noted that the hose 48 can be secured either to the side of the wire 50 as shown in FIG. 3, against the opposite side of the wire, on top of the wire, or below the wire as desired.

It is thus evident that the clip 10 can be quickly and easily applied by a worker using only one hand. In addition, the clip is constructed such that it can be applied by a tool of the type generally identified by numeral 52 in FIGS. 6 and 7. The tool 52 has a base which includes a pair of feet 54 which may rest on a floor or other supporting surface. The base of the tool is shaped such that the feet 54 can be inserted beneath the reinforcing wire 50 and the radiant heating hose 48, as shown in FIG. 7. The tool has a vertical sleeve 56 which extends upwardly from a box 58 which surmounts the base of the tool and contains a pair of laws (not shown) which can be activated to bend the clip body 12 about the hinge 26. A magazine 60 extends from the box 58 and contains a string or queue of the clips 10 which may be secured face to face by adhesive. In this regard, the gaps 34 between the ribs on the clip body provide a space for the application of adhesive and allow the clips to be detached from the string one by one as they are being applied to the hose and reinforcing wire. A handle 62 is provided on one side of the sleeve 56.

Figure 6:
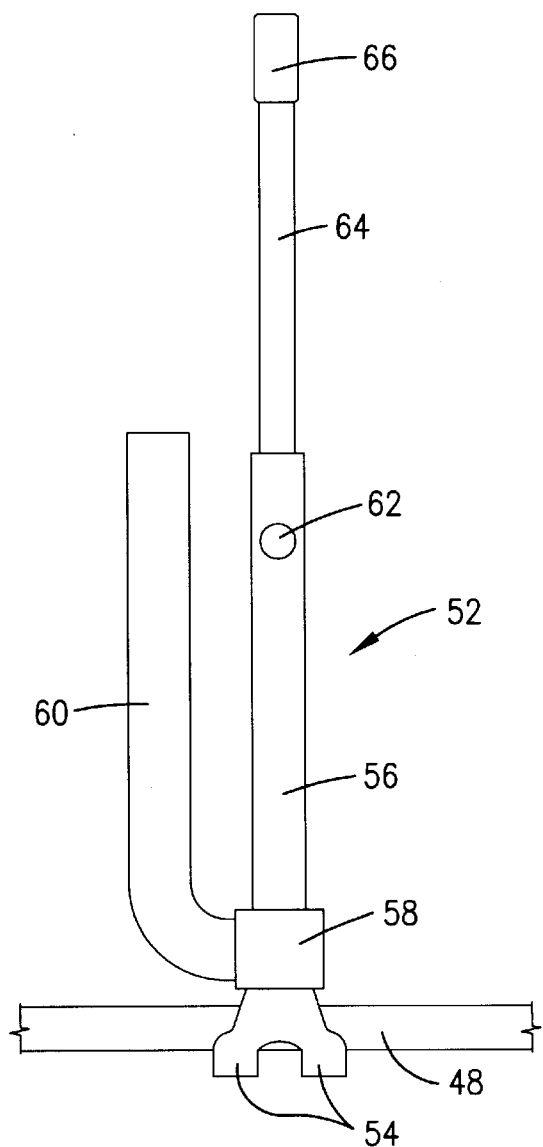
FIG. 6 is an elevational view showing diagrammatically a tool which may be used to apply the retention clips to radiant tubing and reinforcing wire.
Figure 7:
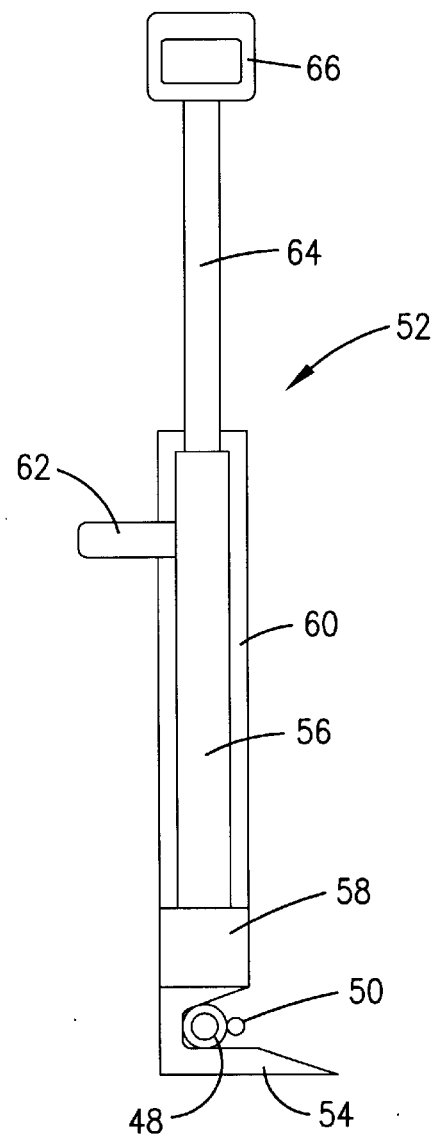
FIG. 7 is an elevational view of the tool taken from the right side of FIG. 6.

A vertical shaft 64 is fitted in the sleeve 56 and is spring loaded so that it is normally in the extended position shown in FIGS. 6 and 7. A handle 66 is provided on the top end of the shaft 64. The shaft 64 can be pushed downwardly against the force of the biasing spring within the sleeve 56, and the downward movement of the shaft 64 activates the jaws in a manner that they bend the clip which at that time underlies them about the hinge 26. This brings the socket 36 and pin 42 together to secure the clip around the hose 48 and wire 50. The shaft 64 is then released so that it is returned by the spring to the extended position, and the next clip in the string located in the magazine 60 moves into position beneath the jaws so that it can be applied by activating the tool through another cycle.

FIGS. 4 and 5 depict an alternative embodiment of the clip which is identical except that the pin 42 is replaced by a shorter pin 142, and a pair of prongs 144 are located on the end of the pin 142. The prongs 144 angle outwardly as they extend away from the tip of the pin 142. When the pin 142 is forced into the passage 38 as the clip is being deformed about the hinge 26, the prongs 144 are forced through the passage and into the socket 36. The ends of the prongs 144 interlock with the shoulder 40 when the pin is fully applied as shown in FIG. 5. Then, the free ends of the legs 14 and 16 are interlocked to secure the clip in extension around the radiant heating tubing and the reinforcing element for the concrete slab. The embodiment shown in FIGS. 4 and 5 can be applied either by hand or through use of the tool 52 in the same manner as the clip shown in FIG. 1.

Still another embodiment of the invention is depicted in FIGS. 8–11. A clip fastener which is generally identified by numeral 110 has a body 112 which has a straight configuration in its undeformed condition. The body 112 has opposite surfaces 114 and 116 which are flat for the most part. The opposite ends of the body 112 carry blocks 118 and 120.

Midway between the blocks 118 and 120, a hinge joint 122 is provided at the center of the body. The surface 116 is provided with a small notch 124 which opposes a rounded recess 126 formed in the opposite surface 114. The portion of the body between the notch 124 and recess 126 forms a hinge about which the body 112 can be bent or flexed through an angle of approximately 90° from the undeformed position shown in FIG. 8 to the fully bent position shown in FIG. 10. In the fully bent position of the hinge joint 122, the opposite sides of the notch 124 come together to prevent additional flexing of the body about the hinge joint 122.

The body 112 has a pair of elbow joints 128 which are located on opposite sides of the central hinge joint 122. One of the elbow joints 128 is located approximately halfway between block 118 and joint 122. The other elbow joint 128 is located midway between the other block 120 and the central hinge joint 122.

The construction of each elbow joint 128 is best shown in FIG. 11. A rounded recess 130 is formed in the surface 114 at each of the elbow joints 128. Each recess 130 extends across the width of the body 112. On the opposite surface 116, a pair of beads 132 are formed on the body 112 on one side of the elbow joint. On the opposite side of the elbow joint, another pair of beads 134 project outwardly from surface 116. Each of the beads 130 and 134 is generally triangular in section, and the opposing pairs of beads 132 and 134 have flat surfaces which generally face one another and form a notch 136 between them. The facing surfaces of the opposing beads intersect at an angle of approximately 90° so that each of the elbow joints 128 can be flexed through an angle of 90° before the notch 136 is closed and the beads 132 and 134 engage one another to limit additional flexing of the body 112 about the elbow joint.

The beads 132 and 134 are located adjacent to the opposite edges of the surface 116. The beads 132 in each pair are spaced apart to present between them a groove 138 (see FIG. 11). Projecting from between each pair of beads 134 is a small block 140 which has a size, shape and location to fit closely in the corresponding groove 138 when the elbow joint is flexed through a 90° arc to the position shown in FIG. 10. Each of the blocks 140 has a leading face which is oriented at 90° to surface 116. Accordingly, when the elbow joint 128 is fully flexed such that the facing surfaces of beads 132 and 134 engage one another, the face of block 140 engages the surface 116 and fits closely in groove 138 between beads 132. As a result of the close fit of the blocks 140 between the beads 132, each of the elbow joints 128 is provided with considerable side to side stability, and forces tending to cause skewing or other displacement of the flexed elbow joints are resisted due to the engagement between the sides of the block 140 and the inwardly facing sides of beads 132.

The hinge joint 122 and two elbow joints 128 divide the length of the body 112 into four legs. One leg 142 is formed between block 118 and the closest elbow joint 128. Another leg 144 is formed between the other block 120 and the adjacent elbow joint 128. The other two legs 146 and 148 are formed between the hinge joint 122 and the two elbow joints 128. Each of the legs has approximately the same length.

Each of the legs is also provided with a stiffening rib 150 which projects outwardly from surface 114. The ribs strengthen and stiffen the legs of the fastener body 112, and prevent the legs from becoming twisted or otherwise misshaped. Gaps are provided between the ribs 150 at the location of hinge joint 122 and the elbow joints 128.

The end block 118 is provided with a rectangular passage 152. As best shown in FIGS. 8 and 10, an angled lead-in surface 154 is provided on the surface of block 118, adjacent to the passage 152 on the side of the passage closest to the end of the fastener 110. A flexible finger 156 extends from block 118 and is located wholly within the passage 152. The finger 156 presents an angled surface 158 which is essentially a continuation of surface 154 located within the socket 152. The surfaces 154 and 156 are inclined at approximately 45° to the main axis of the passage 152. The axis of passage 152 is oriented at approximately 45° to the surfaces 114 and 116.

The finger 156 has a free tip portion 160 which intersects with the main body of the finger 156 to form a generally flat shoulder 162. The shoulder 162 occupies a plane that is perpendicular to the main axis of the passage 152. The finger 156 is flexible enough that the tip portion 160 can be displaced from its normal position shown in FIG. 8 to a position closer to the wall of passage 152 from which the finger 156 projects. The shoulder 162 is spaced a short distance away from the opposite wall of passage 152 in the normal position of the finger.

The block 120 on the opposite end of the body 112 is provided with a projecting tab 164 which is arranged to interlock with the finger 156 when the fastener is applied. The tab 164 has a thickened base 166 which is adjacent to the block 120. The opposite end of the tab 164 is a free end which includes a projecting lug 168 having a curved tip 170. The lug 168 provides a flat ledge 172 which faces toward the block 120. The tab 164 has a size and shape to enter the passage 152, as will be explained more fully. As shown in FIG. 9, the opposite sides of the lug 168 are beveled at 174 such that the lug becomes progressively thinner toward its free end adjacent to the ledge 172.

In use, the clip fastener 110 serves to bind together various types of thin objects. By way of examples the clip fastener 110 may be used to secure wiring harnesses or hoses together in manufacturing operations, to secure reinforcing bars, electrical wiring or plumbing components together in construction activities, or to attach plants to trellises in greenhouse and nursery environments. The clip fastener 110 is also useful to bind a wide variety of other long, thing objects together.

FIG. 10 shows the clip fastener 110 fully applied to secure a radiant heating hose 176 to a reinforcing wire 178. The fastener may be applied by holding the hose 176 adjacent to the reinforcing wire 178 and flexing the fastener body 112 about the hinge joint 122 and the two elbow joints 128 until the fastener body extends completely around the hose and wire in the position shown in FIG. 10. The hinge joint 122 is flexed through a 90° angle, as are the two elbow joints 122. The relative locations of the passage 152 and tab 164 are such that the tab 164 enters the end of the passage 152 as the clip body approaches its fully deformed position. The curved tip 170 is brought against the angled surface 158 of finger 156 and moves along surface 158. This action flexes the finger 156 sufficiently away from its normal position to allow the lug 168 to pass the shoulder 162 on finger 156. Once the lug has passed shoulder 162, the finger 156 snaps back into its normal position, and the ledge 172 is then interlocked with the shoulder 162 in the position shown in FIG. 10. The shoulder and ledge may be directly engaged against one another or spaced apart somewhat as shown in FIG. 10. In either case, the interlocking relationship between the ledge 172 and shoulder 162 secures the end blocks 118 and 120 together and thus secures the fastener 110 in extension around the radiant heating hose 178 and the reinforcing wire 178 to fasten them together.

The lead in surface 154 provides an angled guide surface which guides the curved tip 170 onto surface 158 in the event of a slight initial misalignment between the tab 164 and the passage 152. Likewise, the beveled surfaces 174 on the sides of the lug assist in guiding the lug into the passage and assuring proper alignment so that the parts can interlock in the intended fashion.

The arrangement of the parts and particularly the beads 132 and 134 assures that when the fastener body 112 is in the assembled position of FIG. 10, each of the joints is flexed through an angle of approximately 90°. The two elbow joints are locked at 90° by the engagement between the opposing surfaces of the beads 132 and 134, as well as by the engagement of the face of block 140 with surface 116. The side to side stability of each elbow joint 128 is assured by the close fit of blocks 140 in grooves 138. The construction of the clip fastener 110 thus provides for secure retention of the parts that are to be fastened and for sufficient strength to withstand any forces tending to displace the fastener or detach it from the parts.

Again, the normal use of the fastener 110 in this type of application includes placing fasteners at regular intervals such as every 16 inches or every 24 inches. Because the clip fastener body 112 is straight in its undeformed condition, the fastener 110 is particularly well suited for application by a suitable tool. The fasteners 110 can be arranged in strings or queues which can be separated one at a time in sequence by a suitable fastening tool which may be similar to that shown in FIGS. 6 and 7. The jaws of the fastener can be arranged to effect bending of the body 112 about the hinge joint 122 and both of the elbow joints 128 in a reliable and repeatable fashion.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

It is claimed:

1. A fastener for binding relatively thin objects together, comprising:

a body having an undeformed condition in which said body assumes a substantially straight configuration and terminates in opposite first and second ends;

a hinge joint on said body about which said body can be bent, said hinge joint being approximately midway between said ends;

a pair of elbow joints on said body located on opposite sides of said hinge joint, said elbow joints providing axes about which said body can be bent;

means adjacent said elbow joints for limiting bending of said body about said axes to approximately 90°, said first and second ends coming together when said body is bent through 90° about both of said axes and through 90° about said hinge joint; and interlocking means on said first and second ends for securing said ends together to secure the body around the objects when bent about said hinge joint and axes.

2. A fastener as set forth in claim 1, wherein said means for limiting bending of said body comprises:

a plurality of beads projecting from said body adjacent each elbow joint on opposite sides of the axis associated therewith; and engagement surfaces on said beads contacting one another to prevent further bending when said body has been bent about the axis through approximately 90°.

3. A fastener as set forth in claim 2, wherein said engagement surfaces of the beads on opposite sides of said axis intersect and define an angle of intersection of approximately 90°.

4. A fastener as set forth in claim 3, wherein said beads include a pair of beads on one side of each axis spaced apart to present a groove therebetween, and including a block on the body on the side of each axis opposite said one side located to occupy said groove when the body is bent about said axis, thereby locking each elbow joint against side to side flexing.

5. A fastener as set forth in claim 2, wherein said beads include a pair of beads on one side of each axis spaced apart to present a groove therebetween, and including a block on the body on the side of each axis opposite said one side located to occupy said groove when the body is bent about said axis, thereby locking each elbow joint against side to side flexing.

6. A fastener as set forth in claim 1, wherein said interlocking means comprises a socket on said first end of the body and a male element on said second end arranged and located to enter said socket, said male element and socket having interlocking surfaces engageable when the male element is inserted into the socket.

7. A fastener as set forth in claim 1, wherein said interlocking means comprises:

a socket on said first end of the body;

a finger on said body projecting into said socket, said finger having a normal position and being flexible to allow the finger to be displaced from its normal position;

a shoulder on said finger; and a tab projecting from said second end of the body and having a size and location to enter said socket, said tab having a lug thereon arranged to interlock with said shoulder when the tab enters said socket and displaces said finger to permit said lug to move past said shoulder and interlock therewith.

8. A fastener as set forth in claim 7, wherein:

said finger presents an angled surface against which the application of force effects displacement of the finger from the normal position; and said tab presents a curved tip engageable with said angled surface upon entry of the tab into the socket.

9. A fastener as set forth in claim 8, including tapered side surfaces on said tab to facilitate entry of the tab into said socket.

10. A fastening element for securing together a plurality of elongate objects, comprising:

a body having an undeformed condition wherein the body extends in a substantially straight shape between opposite first and second ends thereof, said body having a length to extend around the objects;

first and second elbow joints on said body spaced away from the respective first and second ends to define a first leg between said first end and said first elbow joint and a second leg between said second end and said second elbow joint, said body being flexible about said elbow joints to bring said first and second ends together with the body extending around the objects;

a pair of beads projecting from said body adjacent each elbow joint on one side thereof, each pair of beads being spaced apart to present a space therebetween;

a block projecting from said body adjacent each elbow joint on the side thereof opposite said one side, said blocks being located to be closely received in said spaces to lock said elbow joints against sideward flexure when the body is bent about the elbow joints; and interlocking means on said first and second ends for locking said ends to one another when brought together.

11. A fastening element as set forth in claim 10, including a pair of beads projecting from said body on said opposite side of each elbow joint at locations to engage the corresponding beads on said one side thereof to limit the arc through which said body can be flexed about each elbow joint.

12. A fastening element as set forth in claim 11, including a hinge joint on said body about which said body can be flexed, said hinge joint being located approximately midway between said first and second elbow joints to define a third leg extending between said first elbow joint and said hinge joint and a fourth leg extending between said second elbow joint and said hinge joint.

13. A fastening element as set forth in claim 12, including stiffening ribs on each of said legs projecting therefrom on a surface opposite a surface of the body from which said beads project.

14. A fastening element as set forth in claim 10, including a hinge joint on said body about which said body can be flexed, said hinge joint being located approximately midway between said first and second elbow joints to define a third leg extending between said first elbow joint and said hinge joint and a fourth leg extending between said second elbow joint and said hinge joint.

15. A fastening element as set forth in claim 10, wherein said interlocking means comprises a socket on said first end of the body and a male element on said second end arranged and located to enter said socket, said male element and socket having interlocking surfaces engageable when the male element is inserted into the socket.

16. A fastening element as set forth in claim 10, wherein said interlocking means comprises:

a socket on said first end of the body;

a finger on said body projecting into said socket, said finger having a normal position and being flexible to allow the finger to be displaced from its normal position;

a shoulder on said finger; and a tab projecting from said second end of the body and having a size and location to enter said socket, said tab having a lug thereon arranged to interlock with said shoulder when the tab enters said socket and displaces said finger to permit said lug to move past said shoulder and interlock therewith.

* * * * *